July 28, 1925.
T. WEBER
1,547,542
TRAILER STEERING MECHANISM
Filed Oct. 6, 1924 2 Sheets-Sheet 1
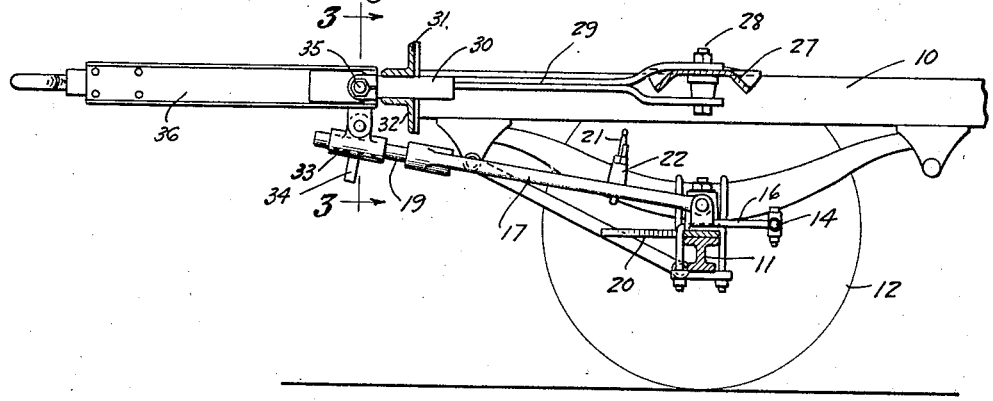
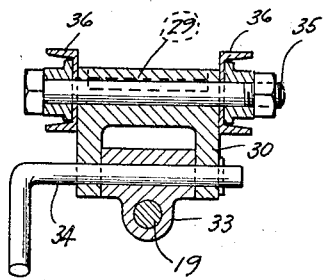
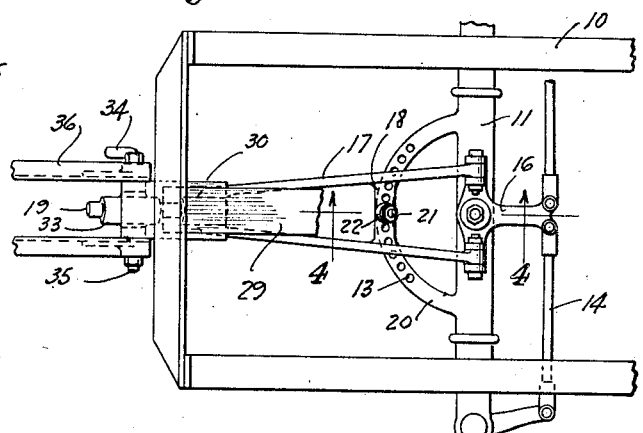
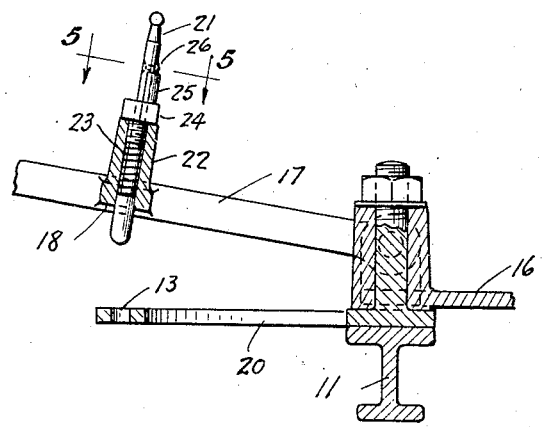
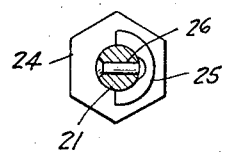
INVENTOR.
Tobias Weber
BY Westall and Wallace
ATTORNEYS.

July 28, 1925.

T. WEBER

TRAILER STEERING MECHANISM

Filed Oct. 6, 1924

1,547,542

2 Sheets-Sheet 2

INVENTOR.
Tobias Weber
BY Nuttall and Wallace
ATTORNEYS.

Patented July 28, 1925.

1,547,542

UNITED STATES PATENT OFFICE.

TOBIAS WEBER, OF LOS ANGELES, CALIFORNIA.

TRAILER-STEERING MECHANISM.

Application filed October 6, 1924. Serial No. 741,854.

*To all whom it may concern:*

Be it known that I, TOBIAS WEBER, a citizen of the United States, and resident of Los Angeles, in the county of Los Angeles, State of California, have invented new and useful Improvements in Trailer-Steering Mechanism, of which the following is a specification.

This invention relates to draw-bars for vehicles, and pertains more particularly to a draw-bar mounted to swing and connected to the front wheels of a vehicle so that the latter are steered thereby. The present invention is particularly adapted for connecting or coupling together of pulling vehicle and trailer.

It is common practice in operating vehicle trains to arrange a connection between the draw-bar and steering mechanism of the trailing vehicle and pulling vehicle so that the draw-bar may be disconnected from the steering mechanism, and the steering mechanism manually operated by someone during the backing of the vehicle. This requires a driver for the pulling vehicle, and another operator commonly known as a swamper for steering the trailer in backing up. The swamper is also compelled during such operation to take a position between the pulling vehicle and the trailer which is dangerous. The primary object of the present invention is to provide a draw-bar structure so arranged that the steering mechanism may be locked in any desired position. Thus, a driver can disconnect the steering mechanism from the draw-bar, turn the wheels to a desired position and lock the steering mechanism, and then back or otherwise move the machine. In addition to the broader objects of this invention there are certain features of structure, whereby a safe, strong, durable, and easily manipulated structure, economical to manufacture is obtained.

Figure 6:
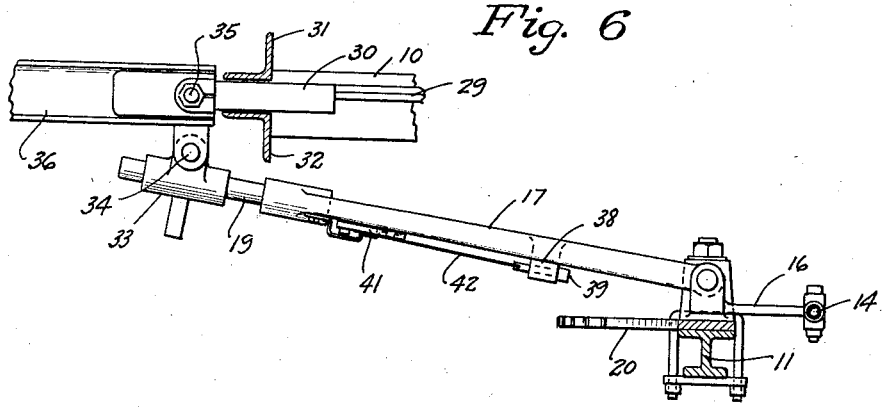
Figure 7:
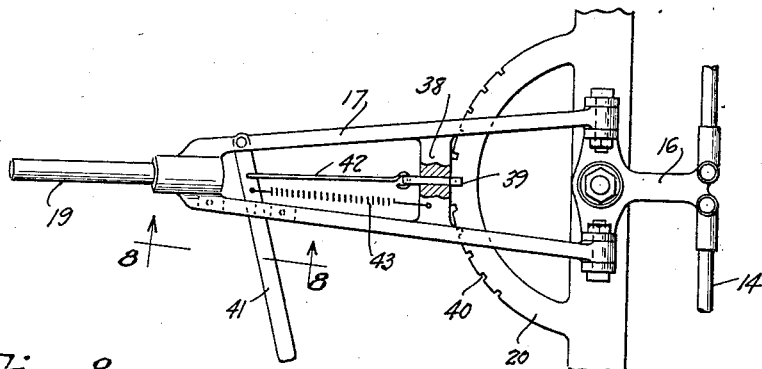
Figure 8:
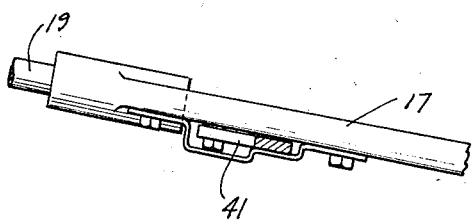

These objects together with other objects and corresponding accomplishments are obtained by means of the embodiment of my invention illustrated in the accompanying drawing, in which:

Fig. 1 is an elevation of the front end of a vehicle equipped with my improved draw-bar mechanism, a part thereof being in section; Fig. 2 is a plan view of the structure shown in Fig. 1, parts being broken away to better show the invention; Fig. 3 is an enlarged section as seen on the line 3—3 of Fig. 1; Fig. 4 is an enlarged section as seen upon the line 4—4 of Fig. 2; Fig. 5 is a section as seen upon the line 5—5 of Fig. 4; Fig. 6 is a fragmentary view similar to Fig. 1 showing a modified form of my invention; Fig. 7 is a plan view of the structure shown in Fig. 6; and Fig. 8 is an enlarged detail view as seen on the line 8—8 of Fig. 7.

Referring more particularly to Figs. 1 to 5, inclusive, 10 indicates the frame of a trailer. Mounted upon the frame by springs and in the usual manner is an axle 11. The front wheels 12 are pivotally connected to the axle and interconnected by the usual steering mechanism, having a drag link 14. Pivotally mounted upon the axle 11 is a steering head 16, it having a rearwardly extending steering lever connected to the drag link and being provided with side arms for pivotal connection thereto of a steering bar 17. The bar 17 is connected to the head so that it may pivot about a horizontal axis. It is of fork form having a bridge member 18 extending between the arms of the fork. At the forward end it is provided with a cylindrical portion 19 adapted to slide in a sleeve later described. Mounted upon the axle is a member having a sector 20 provided with holes 13. In the bridge 18 at the center thereof is formed a housing 22 for a detent pin 21. The detent pin is pressed downwardly by a compression spring 23. A gland 24 is mounted in the housing and extending upwardly therefrom is a segmental sleeve 25. The sleeve embraces substantially one-half of the pin 21. Projecting laterally from the pin 21 is an abutment pin 26 adapted to engage the top of the sleeve when the pin is retracted. To protract the pin, the latter is turned so as to place abutment pin 26 out of engagement with the sleeve 25, detent pin 21 being arranged to be projected into a selected hole 13 in the sector, the steering bar 17 being first swung about its vertical pivot and the detent pin being then swung about its vertical pivot, and the detent pin being then projected into a selected hole to hold the steering bar in a selected position.

Extending across the frame above the axle is a cross bar 27 and at the center thereof is a pin 28. A draw-bar 29 has a forked rear end which embraces the cross member 27, the pin 28 pivoting the draw-bar 29 thereto. The draw-bar 29 is secured at the forward end to a casting 30 which rides in a way formed between spaced angle bars 31 and 32 at the forward end of the frame. Casting 30 has two depending ears and mounted therein is the sleeve 33 which is pivotally secured thereto by a removable pin 34. Rotatably mounted in the upper part of the casting 30 is a pin 35 serving as a pivotal support for the coupling section of the draw-bar indicated by 36. The coupling bar has arms spanning the casting and may be arranged in any convenient manner at the forward end for coupling to a pulling vehicle.

It is obvious that when the parts are in the position shown in Figs. 1 to 4, swinging of the draw-bar will turn the wheels correspondingly and thereby steer the vehicle. Suppose it is desired to manually control the steering wheel. Pin 34 is removed from the casting allowing the steering bar 17 to drop until it rests upon the sector 20. The bar is now swung to a position such that the wheels 12 are at a proper angle, and pin 21 turned so as to protract it into the corresponding hole 13. The wheels are now locked in position, and the operator can return to the vehicle now operative to push backwardly and operate the latter, the trailing vehicle moving through the curve or along the path determined by the angle of the front wheels. When it is desired to have the trailing vehicle follow, the draw-bar 17 is raised, detent pin 21 being retracted, and the sleeve 33 connected to the draw-bar by insertion of the pivot pin 34.

In some instances it may be found advantageous to be able to operate the draw-bar 17 without the necessity of the swamper placing himself in position between the vehicles. To this end I have provided a structure shown in Figs. 6, 7, and 8. Referring more particularly to these figures, the draw-bar and steering bar with their connection and the connection to the drag link are substantially the same as that already described. However, the locking mechanism for the steering bar is different.

Extending between the arms of the steering bar is a bridge 38 and slidably mounted in the bridge is a pin 39. The bridge pin is so positioned with respect to the sector 20, that the pin may be engaged with a notch 40 in the periphery of the sector for locking the draw-bar in any selected position. Pivotally mounted upon the draw-bar is a handle 41 connected by a link 42 to the pin 39. A tension spring 43 is connected to the lever 41 at the bridge in such a manner as to tend to move the lever and protract the pin 39. It is obvious that by withdrawing the pin 34, the steering bar may be dropped and bar 17 turned to a position such as to properly position the steering wheel. Handle 41 is operated to retract the pin 39 and then permitted to engage in the notch locking the wheels in position.

What I claim is:

1. In combination with a trailer having a frame, a front axle and a steering wheel; a draw-bar pivoted on said frame; a steering head mounted on said axle to swing on a vertical pivot in line with the pivotal axle of said draw-bar, said steering head being connected to said wheel so as to swing the latter; a steering bar secured to said head on a horizontal pivot at the rear thereof and detachably secured to said draw-bar at the forward end; a lock plate on said axle below said steering bar so as to support the latter when released from said draw bar; and means to lock said steering bar at any selected angle to said lock plate when disengaged from said draw-bar.

2. In combination with a trailer having a frame, a front axle, and steering wheel; a draw-bar pivoted on said frame; a steering head mounted on said axle to swing on a vertical pivot, said steering head being connected to said wheels so as to swing the latter; a steering bar secured to said head on a horizontal pivot at the rear and detachably secured to said draw-bar at the forward end; a lock sector on said axle below said steering bar so as to support the latter when released from said bar having its arcuate center coincident with the pivotal axis of said steering head; and detent means on said steering bar to engage and lock said steering bar at any selected angle to said sector when disengaged from said draw-bar.

3. In combination with a trailer having a frame, a front axle and steering wheel; a draw-bar pivoted on said frame; a steering head mounted on said axle to swing on a vertical pivot in line with the pivotal axis of said draw-bar, said steering head being connected to said wheels so as to swing the latter; a steering bar secured to said head on a horizontal pivot at the rear and detachably secured to said draw-bar at the forward end; a lock sector on said axle below said steering bar disposed in a horizontal plane and having its arcuate center coincident with the pivotal axis of said steering head so that said steering bar may rest on said sector when disengaged from said draw-bar; and detent means on said steering bar to engage and lock said steering bar at any selected angle to said sector when disengaged from said draw-bar.

4. In combination with a trailer having a frame, a front axle, and steering wheels; a draw-bar pivoted on said frame; a steering head mounted on said axle to swing on a vertical pivot in line with the pivotal axis of said draw-bar, said steering head being connected to said wheel so as to swing the latter, a steering bar secured to said head on a horizontal pivot at the rear and detachably secured to said draw-bar at the forward end; a lock sector mounted on said axle in a horizontal plane and having its arcuate center coincident with the pivotal axis of said steering head, said sector being provided with peripheral notches; a detent pin slidably mounted in said steering head for engaging in a notch of said sector; a handle pivotally mounted on said steering bar and extending laterally therefrom; and linkage connecting said handle and said pin whereby to operate the latter.

In witness that I claim the foregoing I have hereunto subscribed my name this 19th day of September, 1924.

TOBIAS WEBER.